No. 637,444.

J. L. BORSCH.
BIFOCAL LENS.
(Application filed Mar. 18, 1899.)

Patented Nov. 21, 1899.

(No Model.)

WITNESSES:

INVENTOR:
John L. Borsch
by his attorney

UNITED STATES PATENT OFFICE.

JOHN L. BORSCH, OF PHILADELPHIA, PENNSYLVANIA.

BIFOCAL LENS.

SPECIFICATION forming part of Letters Patent No. 637,444, dated November 21, 1899.

Application filed March 18, 1899. Serial No. 709,571. (No model.)

*To all whom it may concern:*

Be it known that I, JOHN L. BORSCH, a citizen of the United States, residing in the city and county of Philadelphia, in the State of Pennsylvania, have invented certain new and useful Improvements in Bifocal Lenses, of which the following is a specification.

My invention relates to lenses, employed in spectacles and eyeglasses, of the special character known as bifocal, that is to say, having two independent focal points located in the vicinity of each other, each occurring in one of the two regions into which the lens is divided, which respective regions are formed of such material and ground to such configuration that their respective coefficients of refraction are of dissimilar power.

In practice bifocal lenses are employed by persons whose vision is of such a character that a lens which enables them to see distant objects does not enable them to see objects or print at close range, such persons being under the necessity either of employing two pairs of glasses, one for distant and one for near vision, or of employing lenses of the character above set forth having distinct regions of dissimilar powers of refraction.

Heretofore bifocal lenses have been frequently formed by matching and uniting edge to edge two pieces of lens glass, each constituting but part of a complete lens, and respectively suitably ground, the one for distant and the other for near vision,—and various forms have by different constructors been given to the respective elements or sections of the lens, the only fixed requirement as to such sections being that they should when united present as to their combined outer edges the usual oval outline of a lens.

In whatever forms the respective independent sections or elements of a bifocal lens of this character have been made, however, they have been united by bringing the respective edges of said sections or elements into contact and cementing the abutting edges by any suitable balsam or uniting medium, or maintaining them in their assembled position by an inclosing lens frame.

This construction has been objectionable, however, by reason of the fact that however carefully the sections are assembled and cemented, a minute cement-filled space exists between the abutting edges, and the cement which is present of course on both surfaces of the lens, in time becomes slightly worn away under the action of heat and the attrition to which it is subjected in the cleaning of the lens, with the result that the permanence of the union between the elements or sections is impaired; furthermore, the line of connection between the two sections of a bifocal lens as heretofore constructed as described is always visible, and not only detracts from the appearance of the lens but is an annoyance to the wearer.

Broadly stated, it is the object of my invention to produce a bifocol lens of an attractive, efficient, and durable, character, in which the objections hereinbefore stated to the existing forms of such lenses shall be obviated.

Generally expressed, my invention comprehends the provision of a lens of usual outline, the body of which is composed of ordinary lens material, such as crown glass, and the faces of which are of any usual curvature or form to produce any selected power or corrective effect to suit the eyes of the wearer,—and herein termed the major lens,—within a suitable recess in one face of which lens is located or mounted a smaller lens,—herein termed the minor lens,—and which is formed of flint glass to constitute an element of index different from that of the major lens, and the refractive power of which minor lens combined with the refractive power of that portion of the major lens which overlies it, produces a net coefficient of refraction distinct from that of the remaining portion or field of the major lens, and, of any desired strength.

In the usual form in which my lens will be constructed, as I contemplate, the major lens will be a lens for distant vision, and the minor lens will constitute a correction of said lens (of an area equal to its own diameter) for near vision.

The major and minor lenses may, of course, be of such form and relative proportions as the constructor or user may prefer, and each may, as heretobefore, be of any desired coefficient of refraction, their respective powers of refraction being entirely independent of each other and capable of being made to conform to the requirements of any usual formula.

In following a prescribed formula to produce a given strength of refraction in the field of the minor lens, and which is composed as will be understood, of said minor lens and the overlying portion of the major lens bounded by the outline of said minor lens, a compound calculation, so to speak, will be required on the part of the lens grinder, and it will be necessary for him to calculate the refractive power to be possessed by that portion of the major lens which overlies or is opposite to the minor lens, and to then conform or grind the minor lens to such shape that its refractive power plus the refractive power of the major lens in the overlying region, will produce the aggregate refractive power prescribed.

The calculation referred to is one which any optician can readily make in accordance with known rules.

In the preferred construction of my improved bifocal lens, in forming the major lens, whether it be the near lens or the distance lens, I not only grind its respective faces to the desired curvature or form, but I also produce in one of said faces, preferably that face which in use is nearer the eye of the wearer, a recess of such form as to be adapted to receive or accommodate the smaller or minor lens.

When, then, the minor lens is mounted and secured within the recess as stated, the result will be a compound lens of such conformation as to possess as to a selected portion of its area, a given coefficient of refraction, and as to the remaining portion of its area, by reason of the presence of the minor lens, a distinct and different coefficient of refraction.

The recess in the major lens is to possess approximately the same curvature as the inner face of the minor lens.

In the accompanying drawings.

Similar letters of reference indicate corresponding parts.

In the drawings.

A indicates the major lens, and B, the recess formed in the inner face of the same.

C is the minor lens, of glass of index different from that of the major lens, and which is, as shown, mounted in the recess B and secured therein by balsam or any suitable material.

In the embodiment of my invention which constitutes what I consider in many respects the preferred form, the major lens is of crown glass and the minor lens of flint glass. The reversal of this arrangement, however, that is to say an embodiment in which the major lens is of flint glass and the minor lens of crown glass,—and which would be, of course, within my claim,—would constitute a valuable bifocal lens.

A bifocal lens embodying my invention, therefore, almost entirely obviates the objections incident to the ordinary construction of bifocal lenses as hereinbefore referred to.

The front face of my improved bifocal lens is uniform in curvature and integral in structure from edge to edge, with the result that the minor lens is not visible to persons other than the wearer except on very close inspection, and the presence of a crevice or joint between the elements, with the accompanying disadvantages of such crevice or joint, is entirely absent from said front face.

Figures 1, 2, 3, 4:
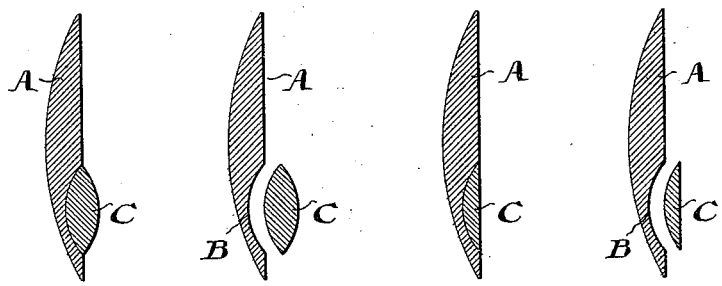
Figure 1 is a vertical, transverse, sectional, elevation of a bifocal lens embodying my invention.
Figure 2 is a view similar to Figure 1, the parts being slightly separated to more plainly exhibit their construction.
Figure 3 is a view similar to Figure 1, illustrating, however, a lens ground to a different form.
Figure 4 is a view similar to Figure 3, the parts being slightly separated to more plainly exhibit their construction.
Figure 5:
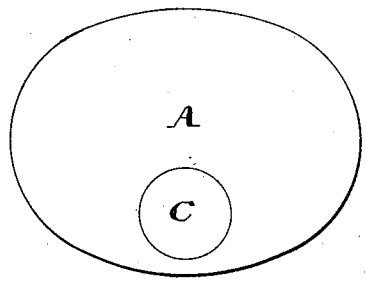
Figure 5 is a view in front elevation of a bifocal lens embodying my invention.

The total thickness of the bifocal lens made up of the major lens and the minor lens is not equal to the normal aggregate combined thickness of both lenses, as is the case in the construction of bifocal lenses in which two lenses have been simply placed face to face, but, owing to the recess in the major lens in which the minor lens is seated, the thickness of the bifocal lens is, in many cases, as, for instance, in the form shown in Figures 3 and 4, not increased at all beyond the thickness of the major lens itself, and in other cases, as in the construction shown in Figures 1 and 2, increased very slightly.

I claim and desire to secure by Letters Patent—

A bifocal lens formed of two pieces of glass of dissimilar index and size placed and secured face to face, the smaller of said lenses being mounted in a recess in the larger of said lenses, and exposed upon one face of the latter, substantially as set forth.

In testimony that I claim the foregoing as my invention I have hereunto signed my name this 16th day of March, A. D. 1899.

JOHN L. BORSCH.

In presence of—
G. A. SCHWAB,
F. NORMAN DIXON.